June 29, 1965 H. C. A. VAN DUUREN ETAL 3,192,317

TELEGRAPH SYSTEM WITH SIGNAL TESTING AND ERROR CORRECTION

Filed June 7, 1961 3 Sheets-Sheet 1

INVENTORS:
H.C.A. VAN DUUREN,
W.F. BROK.
BY Hugh L. Kirk
ATT'Y.

TELEGRAPH SYSTEM WITH SIGNAL TESTING AND ERROR CORRECTION

Filed June 7, 1961

3 Sheets-Sheet 2

INVENTORS:
H. C. A. VAN DUUREN
W. F. BROK
BY
ATT'Y.

June 29, 1965 H. C. A. VAN DUUREN ETAL 3,192,317

TELEGRAPH SYSTEM WITH SIGNAL TESTING AND ERROR CORRECTION

Filed June 7, 1961 3 Sheets-Sheet 3

INVENTORS:
H. C. A. VAN DUUREN,
W. F. BROK
BY Hugh A Kirk
ATT'Y.

3,192,317

TELEGRAPH SYSTEM WITH SIGNAL TESTING AND ERROR CORRECTION

Hendrik Cornelis Anthony van Duuren, Wassenaar, and Wilhelm Fredrik Brok, Voorburg, Netherlands, assignors to De Staat der Nederlanden, ten deze Vertegenwoordigd door de Directeur-Generaal der Posterijen, Telegrafie en Telefonie, The Hague, Netherlands Filed June 7, 1961, Ser. No. 115,521
Claims priority, application Netherlands, June 9, 1960, 252,437
30 Claims. (Cl. 178—23)

The invention relates to a telegraph system with error correction by repetition and gradual correction of disturbed signal elements, as well as to a system with element testing and signal testing (i.e. constant "mark/space" ratio of elements in each signal) connected with it.

In older systems of this kind, signals arriving too early are often lost in repetition cycles, which means loss of information. It has been proposed to store such correctly received signals for further arrangement (see C. J. Van Dalen's copending U.S. patent applications Serial Number 773,925 filed November 14, 1958, now U.S. Patent No. 3,001,018 issued September 19, 1961 and Serial No. 115,380 filed June 7, 1961, filed on even date herewith, both of which copending applications are assigned to the same assignee).

According to the present invention information is stored by a continued integrating reception, i.e. by storing received signals in analogous memory elements during contingent successive repetition cycles.

Thus according to this invention a telegraph system with error correction by repetition and gradual correction of disturbed signal elements is obtained.

The invention will be explained by a system in which the elements are tested for their graduated quality, as well as the signals built up of those elements. The former test implies that the receiver delivers to analogous memory elements, e.g. capacitors, signal elements as quantities or charges of values gradually rising by the fraction of correct reception per signal element. In other terms, the test implies that the number of digital values of the signal elements amounts to more than two and contains besides a zero level also a number of graduated intermediate values or classes according to the fractions of correct reception which correspond to the condition of the transmission path.

The annexed drawings illustrate by way of example an embodiment of a telegraph system according to the invention, in which notably:

The system shown is of the type working with semi-synchronized transmitting and receiving memories, as described in applicants' joint copending U.S. patent application Serial No. 94,337, filed March 8, 1961. It may work otherwise, however, and is notably not tied to block transmission. According to the system of said application, signals are transmitted in blocks of three consecutive signals followed by a pause during which a return signal can be received.

The system of the present application is essentially a simplex system and it is semi-synchronous, that is normally it works synchronously, but after a disturbance, synchronism may be re-established by a start signal if necessary.

Figures 1, 2:
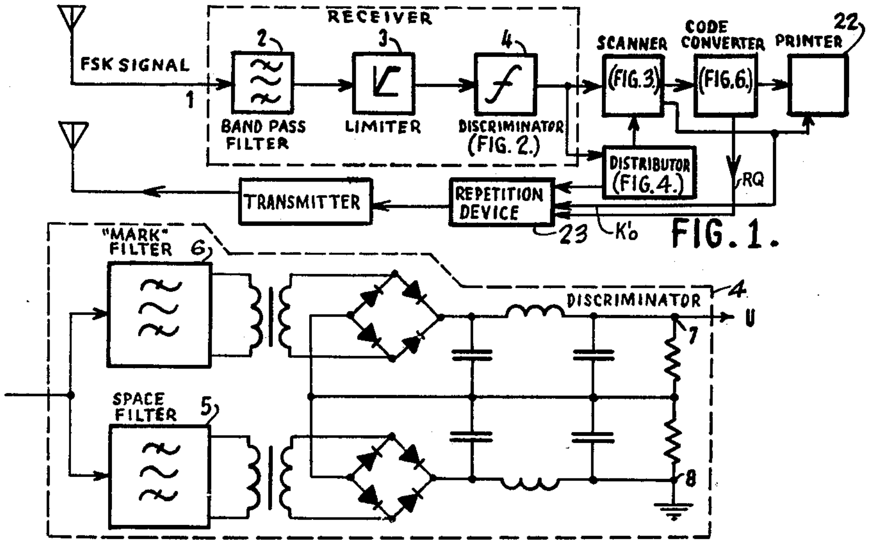
FIG. 1 is a schematic block diagram of a high-frequency radio communication system embodying the circuits of this invention.
FIG. 2 shows a schematic wiring diagram of the discriminating part of the high-frequency circuit shown in FIG. 1, serving to deliver a double-current signal to the scanning system of FIG. 3.

In FIG. 1 the input part of the present system is assumed to arrive as a frequency-shift signal, FSK, passing through a band-pass filter 2, a limiter 3 and is altered by a discriminator 4 into a double-current signal U (see FIG. 2), the amplitude of which, in normal working, is e.g. three times the voltage on the capacitors.

With a telegraphic speed of e.g. 100 bauds the frequency shift signal FSK arriving at the input of the circuit of FIG. 1 may be of a high frequency of 10 mc./s. with 100 c./s. modulation for spacing elements and 100 c./s. modulation for marking elements, which is necessary for a correct working of the following triggers.

The output signal U from the discriminator 4 in FIG. 2 is obtained from a rectifier circuit provided in the last discriminator stage which comprises a spacing frequency filter 5 and a marking frequency filter 6 followed by Graetz full wave rectifier circuits, the output terminals of which are connected in series to deliver a modulated D.C. voltage between points 7 and 8.

Figure 3:
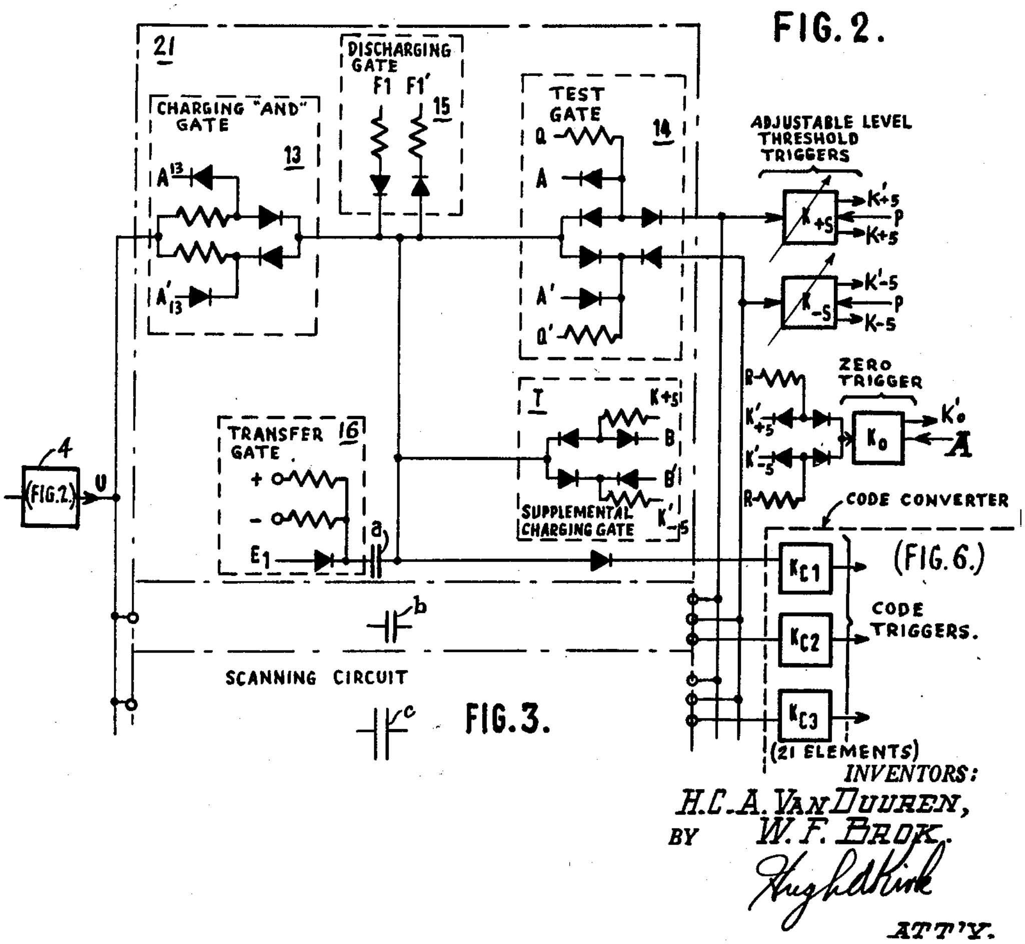
FIG. 3 is a schematic wiring diagram of the scanning system for one element of a group of multi-element signals of the scanner part of the circuit of FIG. 1 showing capacitors in which received signals are stored, element testing triggers, and code triggers which form the input circuit for the code converter of FIG. 6.
Figures 4, 5:
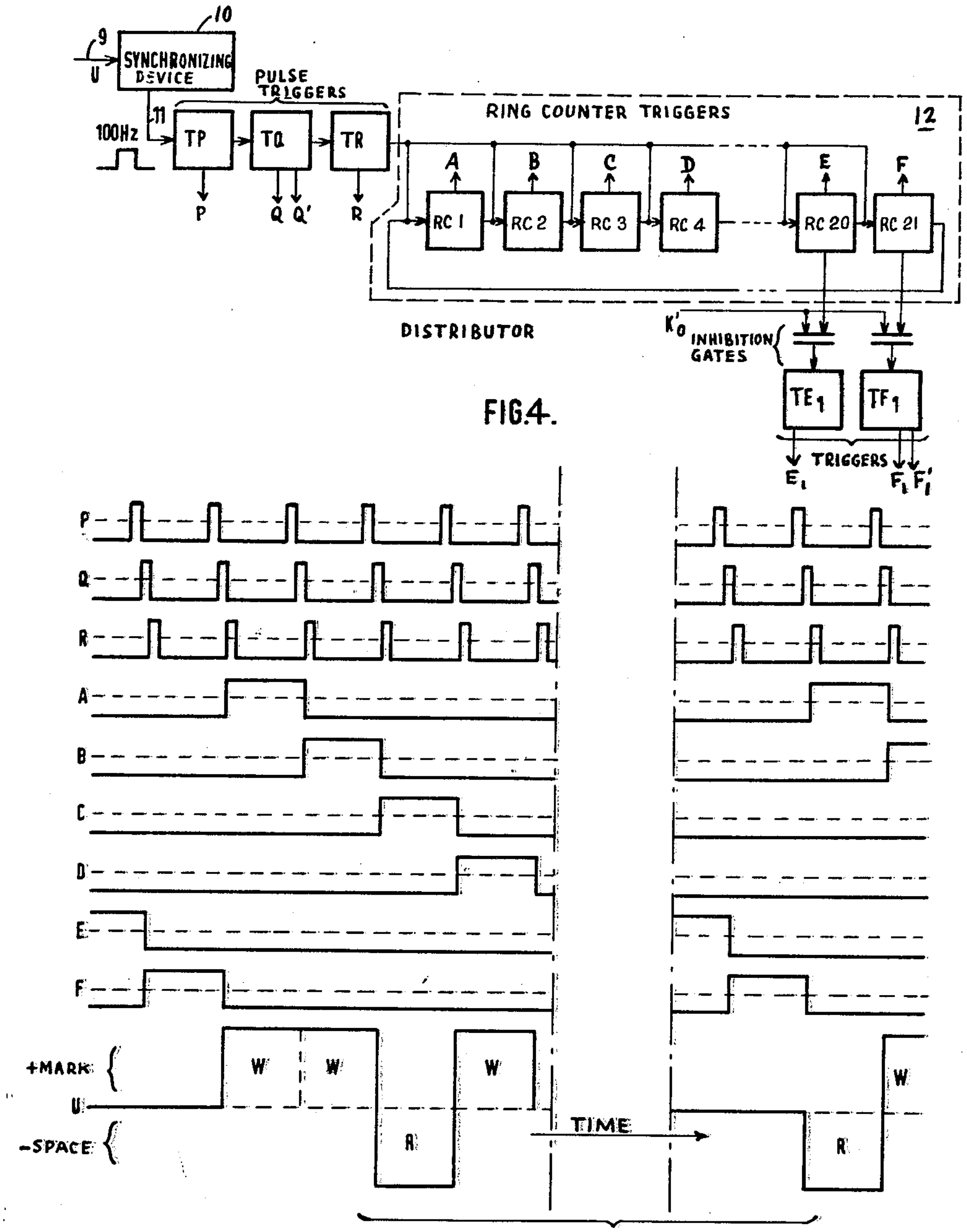
FIG. 4 shows a schematic block wiring diagram of the distributor part of the circuit of FIG. 1 showing a set of triggers supplying the pulses for controlling the circuits in FIG. 3.
FIG. 5 shows wave form diagrams of the shapes and the time positions of the pulses delivered by the triggers of FIG. 4.

This D.C. voltage from the leading edge of the first signal element received is applied via point 9, FIG. 4, to the synchronizing device 10 of the distributor circuit to synchronize the apparatus of this invention, and to which device 10 a series of pulse triggers TP, TQ, TR are connected via a connection 11, as well as a ring counter 12 consisting of triggers RC1, RC2, RC3, RC4 . . . RC20 and RC21 to be extended according to the number of elements of a signal; triggers $TE_1$ and $TF_1$ serving finally to control the scanning circuits of FIG. 3.

The bottom line of FIG. 5 shows by way of example the wave form in which the voltage U may appear. Further FIG. 5 shows the wave forms in time diagrams of the pulse series P, Q, R, A, B, C, D, E, F, from triggers TP, TQ, TR, RC1, RC2, RC3, RC4, RC20 and RC21, the interruption after pulse wave from D showing that in the case of more than four elements per signal the diagram has to be extended accordingly; pulses E and F occuring after the extension.

In the example, the duration of a signal element amounts to 10 ms., contained between the leading edges of two successive R-pulses produced by trigger R. Time in FIG. 5 proceeds from left to right, and, as can be seen, each R-pulse is preceded by a Q-pulse, which in its turn is preceded by a P-pulse.

The inverse pulses belonging to the pulse system are indicated by primes; and are not represented in FIG. 5.

The voltage U from discriminator 4 also arrives at the input terminal of the scanning circuit according to FIG. 3. It is successively divided in time over the capacitors *a*, *b*, etc. The moments when there is a connection between the discriminator 4 output terminal and one of the capacitors are determined by charging gate 13 consisting of a combination of rectifiers and resistors which form together an "and" gate circuit. Thus the charging gate for the element A in scanning circuit 21 will pass a positive voltage from input U to condenser *a*, when the voltage applied to the rectifier marked A13 is positive, which is the case, consequently, when the relevant pulse appears (shown by the pulse on line A in FIG. 5). The same thing applies to the other capacitors *b*, *c*, *d*, etc. and the other blocks (not shown in FIG. 3). If voltage U is negative in such an interval, the relevant capacitors *a*, *b*, *c* . . . etc. is given a negative charge via the A13 rectifier in gate 13 during the inverse A-period. In the interval Q the capacitor *a* voltage is tested via test gates in each unit 14 in common threshold triggers provided in duplicate for each signal element, viz. triggers $K_{+s}$ and $K_{-s}$. The working of these triggers is such that they operate every time a capacitor, e.g. *a*, proves to be charged to a voltage higher than the predetermined adjustable threshold in the trigger. A plurality of pairs of threshold triggers may be associated with each element scanning circuit 21 corresponding to different voltage levels or classes for various degrees of security, so that the threshold can be raised if reception is bad and lowered if the reception is good, thereby decreasing the number of repetitions needed for getting a complete group signal and consequently saving time in the communication. If after the test neither of triggers $K_{+s}$ and $K_{-s}$ has operated, they excite together a zero trigger $K_0$ on the interval of pulse R.

If either trigger $K_{+s}$ or trigger $K_{-s}$ has operated, it is useful in some cases that this trigger recharges via a charging gate T the capacitor it has tested to the standard charge of the same polarity as the charge it has detected. For the *a*-capacitor this is done in the interval of pulse B, for the *b*-capacitor in the interval of pulse C, etc. and for the *f*-capacitor in the interval pulse A. The operation of the zero trigger $K_0$ causes the rejection of the relevant signal, which in this case is due to the rejection of the signal element.

The transmission of an error repetition request signal, and the attendant blocking of the printer 22 (see FIG. 1) and start of the repetition device 23 can be effected immediately, if the so-called element repetition is applied, to operate at the end of the relevant signal or of the relevant block of three signals, if signal or block repetition, respectively, are employed by connection from trigger RC21 to the repetition device 23 (see FIG. 1).

After the test, if the zero trigger $K_0$ has not operated, all the capacitors *a*, *b*, *c*, etc. (twenty-one in number, one for each element of 3 seven element signals) belonging to the scanning circuit of FIG. 3 are connected to a set of code triggers $K_{c1}$ through $K_{c21}$ having a higher responsiveness than the threshold triggers, notably at moment of pulse $E_1$. The moments $E_1$ and $F_1$ are derived from triggers E and F via inhibition gates, which suppress them if trigger $K_0$ has operated (see FIG. 4).

The operation of the zero triggers $K_0$ means that one of the twenty-one capacitors, e.g. *a*, *b*, *c* . . . etc. *a* has an insufficient charge, and according to the invention this capacitor must get the opportunity to receive, by a repetition of the signal, a sufficient charge to change over its corresponding threshold triggers $K_{+s}$ or $K_{-s}$.

To this end the working of the discharging gate 15 is suppressed by a blocking of triggers $TE_1$ and $TF_1$; while in the case of normal reception, this gate 15 is opened at moment of pulse $F_1$ to discharge each of the twenty-one capacitors *a*, *b*, *c*, etc. Trigger $K_0$ is periodically restored to normal by the moment of a pulse A.

At moment of pulse $E_1$ an applied voltage to the transfer gates 16 causes the charges of the twenty-one capacitors *a*, *b*, *c*, etc. to be shifted to the code triggers $K_{c1}$ through $K_{c21}$. This process too is suppressed if the zero trigger $K_0$ has operated. So the device works as follows:

After an 21-units signal series has been received for the first time, the twenty-one pairs of triggers $K_{+s}$ and $K_{-s}$ have taken certain states, which for the time being will be supposed to be all clear or sufficient "+" or "−" states.

At the end of the 21-units signal series, with the feedback paths or supplementary charging gate T, all the capacitors *a*, *b*, *c* etc. can then be charged with the same voltage so as to have a clear, sufficient, adequate, or complete voltage for charging the code triggers $K_{1c}$ through $K_{21c}$ described later (for example: it may be ⅓ of the maximum value of U with undisturbed transmission). In principle, however, the system also works without these supplemental charging gates T. At the moment of pulse E, all the code triggers $K_{c1}$ through $K_{c21}$ are put in the states corresponding to the charges of the associated capacitors *a*, *b*, *c*, etc. in connection with which these code triggers $K_{c1}$ through $K_{c21}$ have no fixed normal state.

If at the first scanning one of the twenty-one elements *s* causes an insufficient "+" or "−" charge, the triggers $K_{+s}$ and $K_{-s}$ remain at normal and change over separate zero trigger $K_o$. When the output terminals of all the twenty-one condensers *a*, *b*, *c*, etc. are tested now, the whole 21-element signal series is rejected. This results in a request for repetition, such as via conductor RQ from the code converter to the repetition device 23 in FIG. 1 upon detection in the code converter of a special RQ signal requesting said repetition, in consequence of which the signal is given once more. At the second reception, the charge of capacitor *a*, which has been preserved after the first reception, can be completed or altered, since no completing voltage is received back via the supplemental charging gate T as long as the corresponding $K_s$-trigger has not yet responded.

The circuit may be so arranged that at a second or next time, the code triggers which had been set the first time keep their charge.

Figure 6:
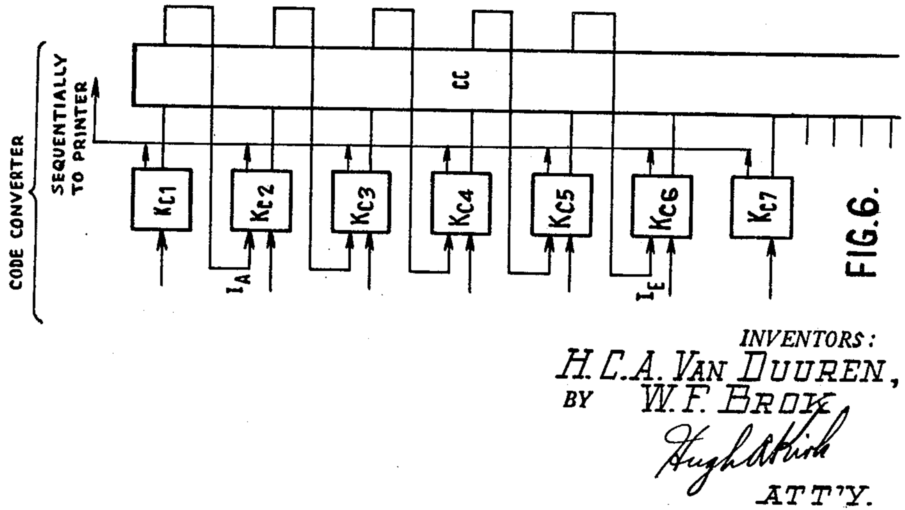
FIG. 6 is a schematic block wiring diagram of the code converter part of the circuit of FIG. 1.

In the diagram of the code converter, FIG. 6, part of the column of code triggers $K_{c1}$–$K_{c21}$ is shown once more. At a control moment the code conversion in the code converter CC is carried out almost at once, i.e. immediately after the return of code triggers $K_{c1}$ through $K_{c21}$ to the normal state. By means of the new code, which may contain e.g. five units, five of the seven code triggers viz. triggers $K_{c2}$ through $K_{c6}$, are set again, after which the signal can be passed to the printer sequentially.

This conversion is carried out by groups of seven units in the 21-unit block.

Figure 7:
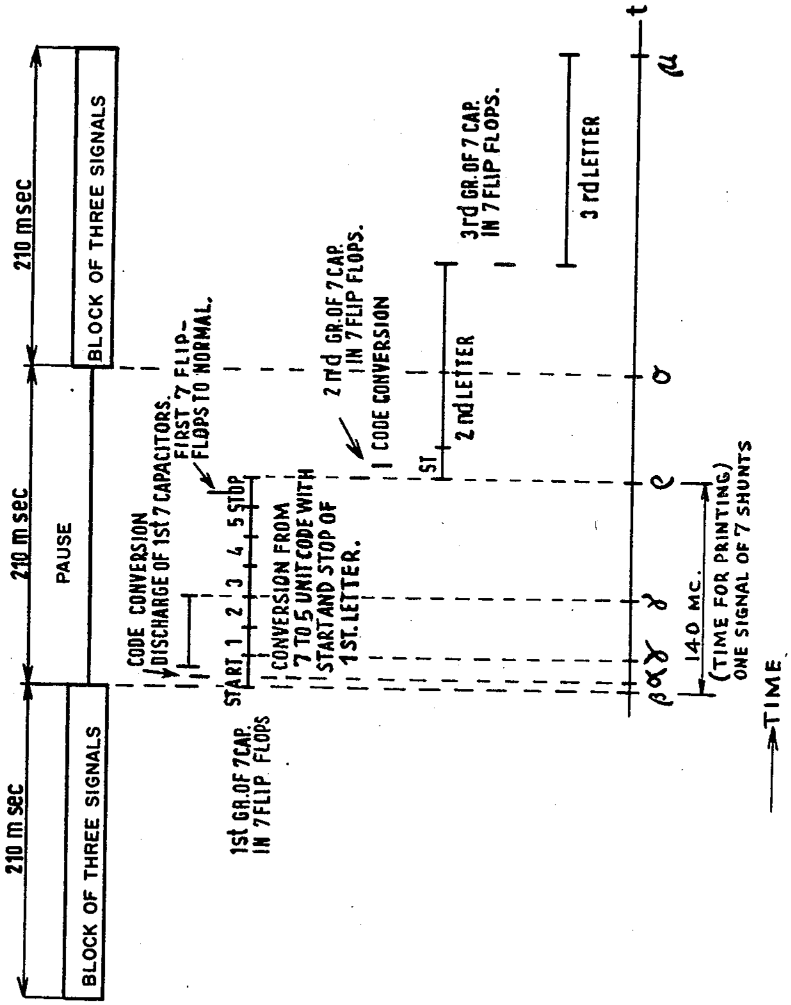
FIG. 7 is a general time diagram of the reception of a block of three consecutive seven units signals.

FIG. 7 shows in a time diagram the moments of all these operations. Notably the top shows the transmission of two blocks of three signals separated by a pause of the same duration as a block (viz. 210 milliseconds). This is a section of an indefinitely proceeding series. Several moments are indicated at the bottom, supposing that the first signal is received in the first seven capacitors or condensers, tested to be sufficient or clear, and passed to the seven code triggers or flip-flops, and that at moment $\beta$ the conversion of the charges of these first seven code triggers in the five-units code and the subsequent passing of the signal to the printer must begin. It is assumed that the code conversion and the folowing transmission of the signal to the printer, to begin with a "start" element folowed by five intelligence elements and a "stop" element during which the code triggers are restored to normal have been effected in interval $\alpha$.

The discharge of the first seven capacitors has finished at moment $\gamma$.

The signal element length of the printer is 20 ms. It can be seen from the drawing that the printing of the third letter has finished just at the end of the second block group time, at moment $\mu$.

While we have illustrated and described what we regard to be the preferred embodiment of our invention, nevertheless it will be understood that such is merely exemplary and that numerous modifications and rearrangements may be made therein without departing from the essence of the invention, we claim, 1. A telecommunication system for mark/space multi-element signals between two stations, said system comprising at each station:

(A) receiving means for said signals, (B) detecting means connected to said receiving means for discriminating between the mark elements and the space elements in each signal and for forming them into potentials of correspondingly different polarities, (C) pulse generating means connected to said discriminating means for generating controlling pulses for each element of each signal, (D) scanning means connected to said discriminating means and to said pulse generating means for scanning each element of each signal, said scanning means comprising:

(1) separate potential storing means for each said element of each signal, (2) measuring means connected to each said storing means for measuring the potential level of each stored element, and (3) a blocking means connected to said measuring means for preventing the removal of the potentials in said storing means when at least one stored element has been measured to be incomplete, (E) means connected to said storing means for passing stored signal elements which have been measured to be complete to an output circuit, (F) means connected to said blocking means to request repetition of signals which contain at least one stored element which has been measured to be incomplete, and (G) means at the other and remote station responsive to said repetition requesting means to repeat the signal incompletely stored to said storing means to supplement the potential therein until it is measured to be complete.

2. A system according to claim 1 wherein said multi-element mark/space signals comprise seven elements.

3. A system according to claim 1 wherein the received signals are modulated on a high frequency carrier and said receiving means comprises a band pass filter.

4. A system according to claim 3 wherein said receiving means also includes a limiter.

5. A system according to claim 1 wherein said discriminating means includes separate filters for said mark element and said space element.

6. A system according to claim 5 wherein said discriminating means includes full wave rectifiers connected to each of said filters.

7. A system according to claim 1 wherein said pulse generating means includes a plurality of pulse generating triggers and a ring counter of triggers corresponding in number to the number of elements to be stored in said scanning means.

8. A system according to claim 1 wherein said pulse generating means includes means for synchronizing said system in accordance with the leading edge of the first element of each signal received.

9. A system according to claim 1 wherein said scanning means includes a charging gate means connected between said storing means and said detecting means and connected to and controlled by said pulse generating means.

10. A system according to claim 9 wherein said charging gate means includes resistor and rectifier means.

11. A system according to claim 1 wherein said storing means includes separate storing means for each element of a plurality of signals in a group.

12. A system according to claim 1 wherein said mark and space elements have potentials of opposite polarity and said measuring means includes separate polarity determining means for each element of each signal.

13. A system according to claim 1 wherein said measuring means is adjustably responsive to different voltage levels.

14. A system according to claim 1 wherein said measuring means comprises a pair of threshold triggers.

15. A system according to claim 14 wherein said measuring means comprises a testing gate connected between said storing means and said threshold triggers.

16. A system according to claim 14 wherein said blocking means comprises a trigger means controlled by said threshold triggers and said pulse generating means.

17. A system according to claim 1 wherein said scanning means includes means connected to said measuring means for supplementing the charge on said storing means after said signal element has been measured and before it has been transferred to said passing means.

18. A system according to claim 1 wherein said scanning means includes a transferring gate connected to said storing means for passing its stored element to said passing means.

19. A system according to claim 1 wherein each said storing means includes a condenser for storing the charge of each element of each signal in said scanning means.

20. A system according to claim 1 wherein said scanning means includes means connected to said storing means for discharging said storing means after the stored signal element has been transferred to said passing means.

21. A system according to claim 1 wherein said passing means includes a code converting means.

22. A system according to claim 21 wherein said code converting means includes a code trigger corresponding to each of the elements stored in said scanning device.

23. A system according to claim 1 wherein said storing means includes means for storing the elements of a plurality of signals in a group, and wherein said blocking means operates only after all of the signal elements of said group have been stored for controlling said repetition requesting means and said passing means.

24. A telecommunication system for mark/space multi-element signals between two stations comprising at each station:

(A) receiving means for said signals, (B) detecting means connected to said receiving means for discriminating between the mark elements and the space elements in each signal and for forming them into potentials of corresponding opposite polarities, (C) pulse generating means connected to said detecting means for generating pulses for controlling each element of each signal and for generating additional controlling pulses, (D) scanning means connected to said detecting means and to said pulse generating means for scanning each element of each signal, said scanning means comprising:

(1) separate charging gate means for each element to be stored and controlled by said detecting means and pulse generating means, (2) separate potential storing means connected to each charging gate means for storing each element of each received signal, (3) measuring means connected to each said storing means for measuring the polarity and potential level of each stored element, (4) a common blocking means connected to all said measuring means for preventing said additional controlling pulses in said pulse generating means from removing the potentials in said storing means when at least one stored element has been measured to be incomplete, (5) separate transferring gate means connected to each storing means and said pulse generating means to be controlled by said additional controlling pulses for transferring said stored elements which have been measured to be complete from said storing means, and (6) separate discharging gate means connected to each said storing means and said pulse generating means to be controlled by said additional controlling pulses for discharging said storing means after said transferring gate means has been operated;

(E) code converting means connected to said transferring gate means for converting said transferred elements of said signals into another code, (F) printing means connected to said code converting means for printing the resulting converted code signals, (G) repetition requesting means connected to and controlled by said blocking means for requesting a repetition of signals which contain at least one stored element which has been measured to be incomplete, and (H) means at the other and remote station responsive to said repetition requesting means to repeat the signal incompletely stored to said storing means to supplement the potential therein until it is measured to be complete.

25. A system according to claim 24 wherein said scanning means includes means connected to said storing means and connected to and controlled by said measuring means for supplementing the charge on said storing means after the signal element in said storing means has been measured by said measuring means to be complete.

26. A system according to claim 24 wherein said scanning means includes means for storing separate elements of a plurality of signals in a group of signals, and said blocking means is responsive for controlling said repetition requesting means when one element in said group of signals has been measured to be incomplete.

27. In a telecommunication system for multi-element code signals from one station to another, each station having a transmitter, a receiver, and an automatic repetion device, wherein each element is detected by said receiver as one of two different potentials; the improvement comprising:

(A) means for storing each element potential as it is received, (B) testing means connected to said storing means responsive to a predetermined potential level of said stored element, (C) means connected to said storing means for removing the potential of said element stored therein, and (D) means connected to said testing means for preventing the potential removing means from operating, and for operating said repetition device to repeat a below-level tested signal element for supplementing the potential on said storing means until said predetermined level is reached and said removing means is operated.

28. A system according to claim 27 wherein said different potential levels have opposite polarity, and wherein said improvement includes:

(E) means connected between said storing means and said testing means for determining the polarity of said stored element.

29. A system according to claim 27 including:

(F) means connected to said storing means for responding to the elements stored therein, and (G) means connected to said testing means for permitting said responding means to operate when said potential of the stored element is at least at said predetermined level.

30. In a telecommunication system for multi-element code signals from one station to another, each station having a transmitter, a receiver, and an automatic repetition device, wherein each element is detected by said receiver as one of two different potentials; the improvement comprising:

(A) means for storing each element potential as it is received, (B) testing means connected to said storing means responsive to a predetermined potential level of said stored element, (C) means connected to said storing means for responding to said elements stored therein, and (D) means connected to said testing means for permitting said responding means to operate only when said potential of said stored element is at least at said predetermined level, and for preventing the removal of said potential from said storing means until said predetermined level has been built up.

References Cited by the Examiner

UNITED STATES PATENTS

| | | | |
|---|---|---|---|
| 2,805,278 | 9/57 | Van Duuren | 178—23 X |
| 2,970,189 | 1/61 | Van Dalen et al. | 178—23 |
| 2,988,596 | 6/61 | Van Dalen | 178—23 |
| 2,995,626 | 8/61 | Van Duuren | 178—23 |

MALCOLM A. MORRISON, *Primary Examiner.*

NEWTON N. LOVEWELL, *Examiner.*